Jan. 12, 1965  R. M. STEPHENSON  3,165,447
NUCLEAR CHAIN REACTORS

Filed May 5, 1961  4 Sheets-Sheet 1

INVENTOR.
RICHARD M. STEPHENSON
BY Richards & Geier
ATTORNEYS

Jan. 12, 1965  R. M. STEPHENSON  3,165,447
NUCLEAR CHAIN REACTORS
Filed May 5, 1961  4 Sheets-Sheet 2

INVENTOR.
RICHARD M. STEPHENSON
BY
Richards & Geier
ATTORNEYS

Jan. 12, 1965  R. M. STEPHENSON  3,165,447
NUCLEAR CHAIN REACTORS
Filed May 5, 1961  4 Sheets-Sheet 3
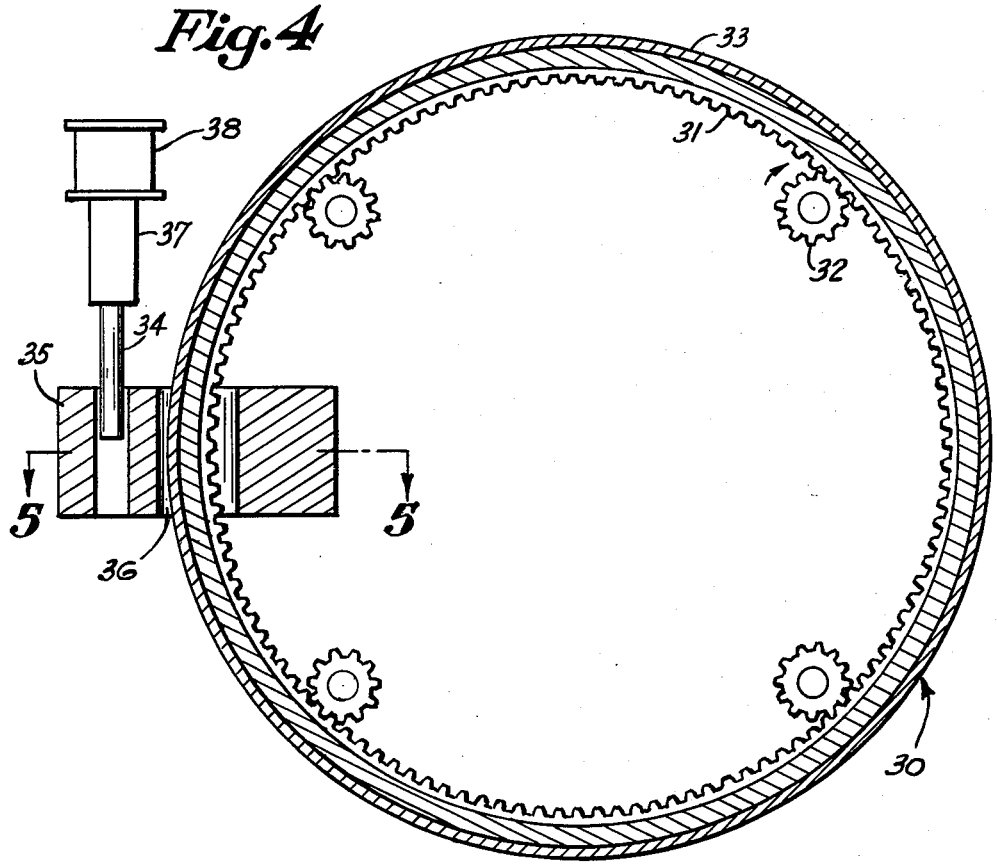
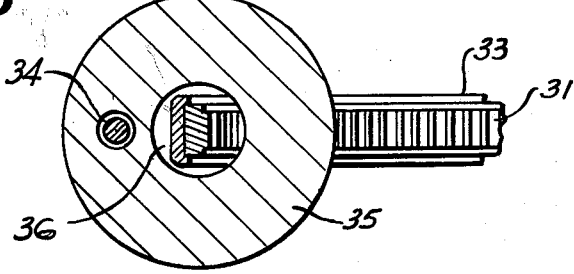
INVENTOR.
RICHARD M. STEPHENSON
BY Richards & Geier
ATTORNEYS Jan. 12, 1965 R. M. STEPHENSON 3,165,447
NUCLEAR CHAIN REACTORS
Filed May 5, 1961 4 Sheets-Sheet 4

INVENTOR.
RICHARD M. STEPHENSON
BY Richards & Geier
ATTORNEYS 3,165,447
NUCLEAR CHAIN REACTORS
Richard M. Stephenson, Storrs, Conn.
Filed May 5, 1961, Ser. No. 108,094
1 Claim. (Cl. 176—33)

This invention relates to nuclear reactors and refers more particularly to nuclear chain reactors of the type particularly suitable as research or test reactors.

Reactors intended for use as research or test reactors should have the highest possible neutron flux; light- or heavy water-cooled reactors of the heterogeneous type (i.e. with an interposition of moderator and fuel region) are considered best suited for that purpose. The moderator consists usually of heavy water, light water, graphite, beryllium or other suitable material, while the flux-producing fuel region may be composed of aluminum clad enriched uranium fuel plates. In the construction of such reactors it is necessary to overcome such problems as heat transfer, thermal stress, fuel-element technology, proper coolant distribution, fuel burn-up etc. In all such reactors the maximum power output is set by the heat transfer surface, which determines the maximum temperatures in the fuel elements and the possibility of exceeding the burn-out heat flux. The most modern of reactors which are in the design and construction stage at the time of filing of this patent application, have a thermal flux of about $10^{15}$. It is a matter of general knowledge that for some work, even higher fluxes are desirable.

An object of the present invention is the provision of a nuclear reactor of the described type which has an increased thermal flux due to the elimination of the problem of heat transfer in the reactor core.

Another object is the provision of a reactor wherein heat generation in the core is removed as sensible heat of the fuel element, whereby it is not necessary to transfer any heat from fuel to coolant within the reactor core itself.

A further object is the provision of a reactor having an increased efficiency in cooling through the reduction of the quantity of heat which must be transferred from fuel to coolant per unit volume of the core.

Yet another object is the provision of a reactor wherein hot-channel factors resulting from local variations in specific power, are substantially eliminated.

Other objects of the present invention will become apparent in the course of the following specification.

In accomplishing the objects of the present invention it was found desirable to provide a reactor having movable fuel elements. The same results can be attained through the use of a movable moderator or reflector region, while the fuel elements remain fixed. The advantage of such constructions is that most of the heat transfer would take place outside of the active section. According to one embodiment of the inventive idea, the fuel elements are placed on an endless belt which moves them continuously through the active core, then out to an external region where the fission heat is removed, and finally back to the core. Due to this alternate cycling of the fuel in and out of the active core, the fission heat is distributed through a volume of fuel greater than twice a critical mass. According to a different embodiment a reactor of the flux-trap type may be provided with a long fuel region which oscillates up and down to distribute the heat production through a larger volume. Such construction can be modified by having a fixed fuel region while the reflector oscillates up and down.

The invention will appear more clearly from the following detailed description when taken in connection with the accompanying drawings showing, by way of example only, preferred embodiments of the inventive idea.

In the drawings:

FIGURE 4 is a schematic vertical cross-sectional view of another embodiment of the present invention.

FIGURE 5 is partly a schematic horizontal cross-sectional view along the line 5—5 of FIGURE 4 and partly a top view.

Figure 1:
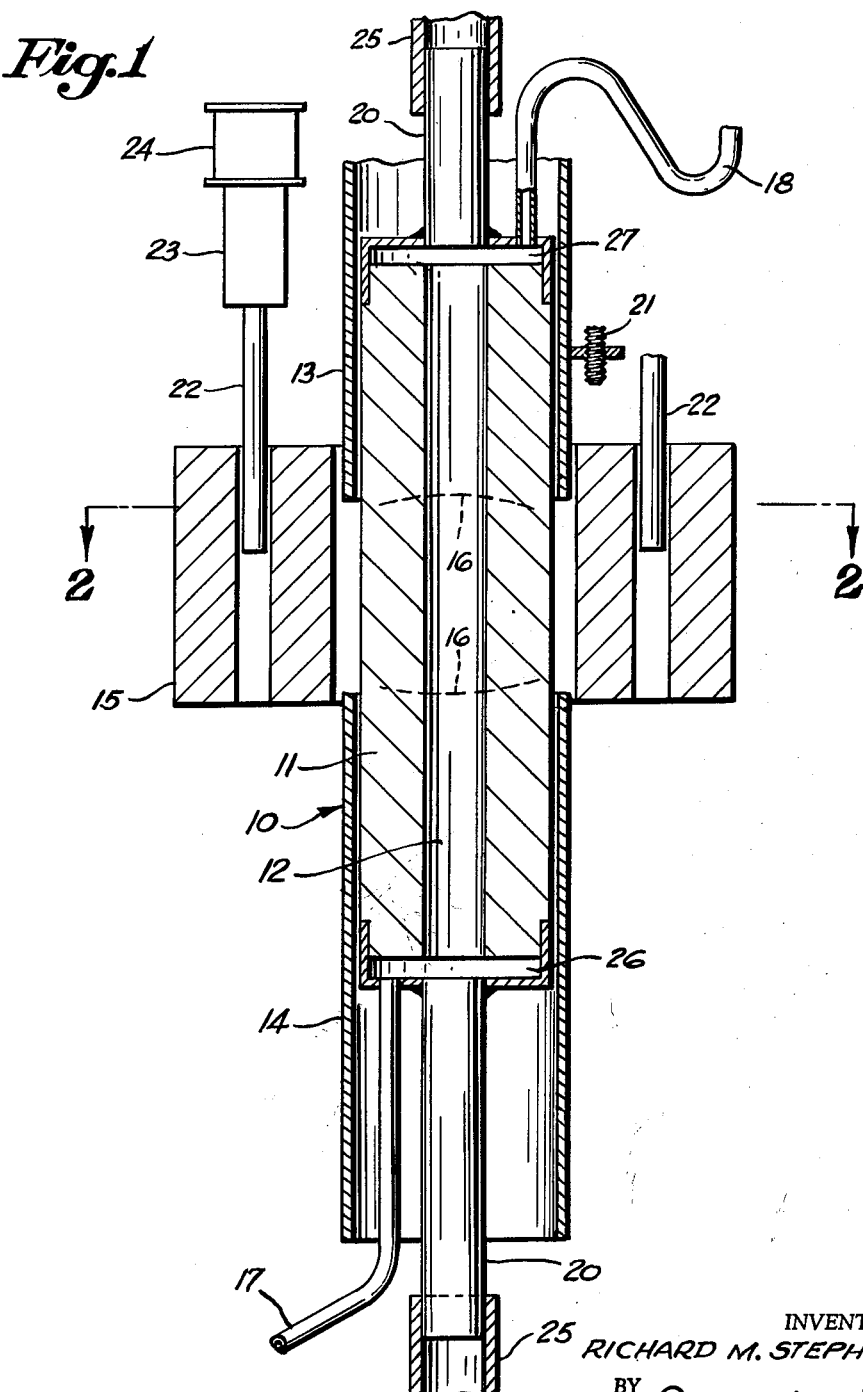
FIGURE 1 is a schematic vertical cross-sectional view of a nuclear reactor of the present invention.
Figure 2:
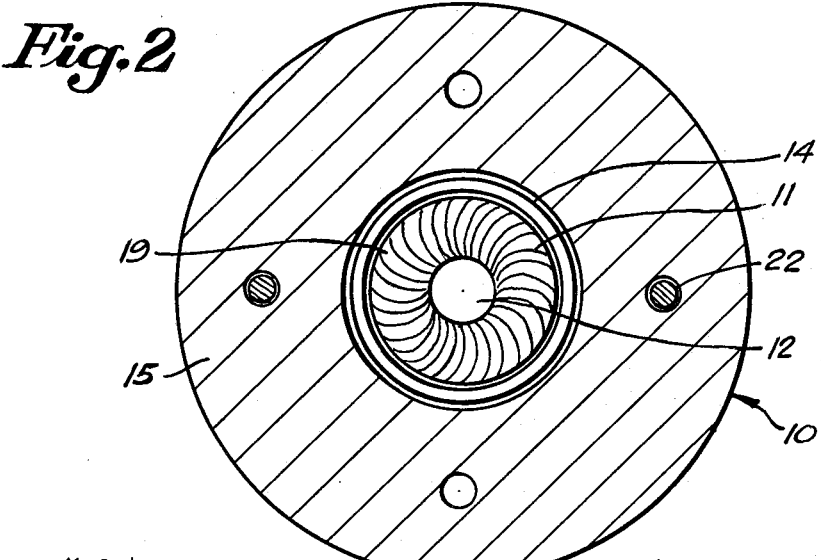
FIGURE 2 is partly a schematic horizontal cross-sectional view along the line 2—2 of FIGURE 1 and partly a top view.

FIGURES 1 and 2 illustrate a flux-trap reactor 10 having a heterogeneous moving fuel 11 enclosing a central flux-trap island region 12 containing light water which flows continuously through the region 12. An adjustable thermal neutron absorber 13 encloses the top section of the fuel 11 to prevent establishment of a chain reaction in this region. A similar fixed thermal neutron absorber 14 surrounds the lower section of the fuel 11. A fixed annular beryllium reflector 15 encloses the central portion of the fuel 11 so as to confine the nuclear chain reaction to the active zone which is designated by broken lines 16 in FIGURE 1.

The following constructional example is given solely by way of illustration:

The central region 12 has the shape of a cylindrical passage having 14 cm. in diameter and containing light water which is passed continuously through the passage 12 by means of flexible pipes 17 and 18. Entrance and exit plenums 26 and 27 distribute the coolant between the fuel 11 and central region 12.

The heterogeneous fuel 11 consists of aluminum plates 0.040 inch thick having an aluminum-uranium alloy which is jacketed with aluminum. The entire fuel region is annularly shaped and has an outer diameter of 36 cm. and 11 cm. in thickness; the active fuel consists of fully enriched $U^{235}$. The $U^{235}$ concentration in the fuel varies from $20$–$39.8 \times 10^{19}$ atoms/cm.$^3$ to equalize the specific power in the core 11. The weight of $U^{235}$ is 3.5 kg. for each vertical foot of the core.

The usual coolant channels 19 are 0.040 inch thick and the metal to water ratio is 1.0. The core is cooled by light water passing through the fuel elements with a velocity of 10 ft./sec.

The total height of the fuel 11 is 3 feet.

The entire fuel 11 oscillates up and down by means of a suitable device comprising a piston 20 which is attached to the top and bottom of the fuel 11 and which is driven by compressed air which is alternately admitted to cylinders 25 located above and below the fuel region.

As the result of this movement heat production by fission is distributed throughout the entire volume of the core material.

The thermal neutron absorber 13 consists of an annular cylindrical sheet of cadmium metal having a 38 cm. mean diameter and jacketed with aluminum sheets. A suitable device 21 is used to raise and lower the thermal neutron absorber 13, so as to provide control of the active region 16. The location of the thermal neutron absorber 13 at the top section of the fuel 11 prevents the establishment of a chain reaction in this region.

The lower thermal neutron absorber 14 is fixed; it consists of the same material and has the same size as the upper thermal neutron absorber 13.

The cylindrical reflector 15 consists of beryllium and has an inner diameter of 42 cm. and an outer diameter of 96 cm. It confines the nuclear chain reaction to the region 16 surrounded by the reflector 15.

Control rods 22 made of boron or other materials having similar properties are located in the reflector 15 for fine control of the active section. The control rods 22 are connected with control rod drive mechanisms 23 and control rod safety scram devices 24 of the usual type.

In operation, the fuel 11 is oscillated up and down by the piston 20. During this oscillation different parts of the fuel 11 constitute the active section 16 and the heat production is about constant throughout the core. The fission heat is distributed through a volume of fuel greater than twice a critical mass. Since cooling takes place continuously throughout the fuel, the efficiency of heat removal is thus increased.

Figure 3:
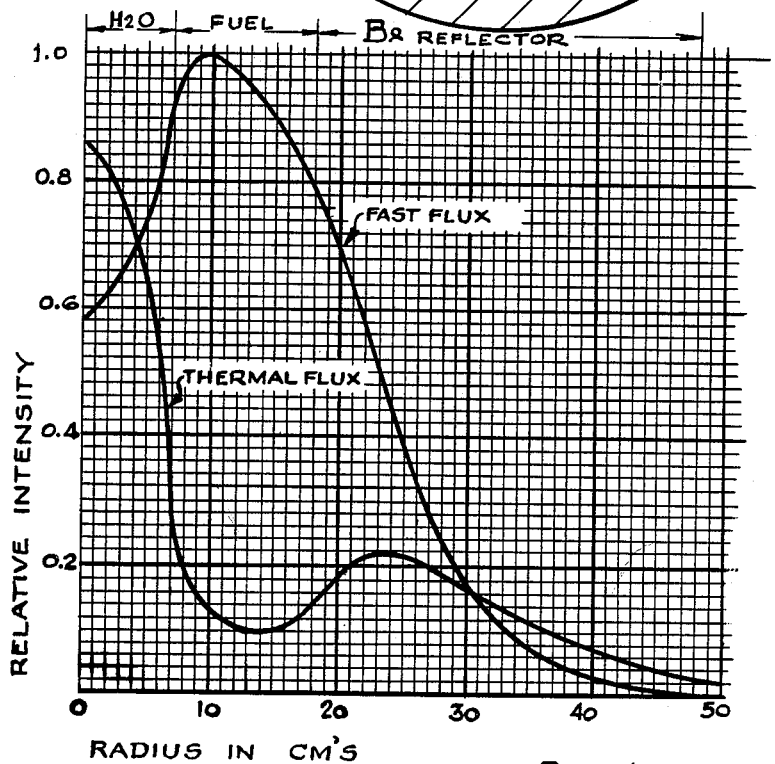
FIGURE 3 is a graph showing the variation of neutron flux with respect to the radial distance from the center of the reactor.

FIGURE 3 is a graph of calculated values for this reactor showing neutron flux plotted against the radial distance from the center of the reactor with the radius in centimeters.

The following calculated table provides the data for a heterogeneous flux-trap reactor of the described type:

| Internal reflector radius, cm. | Thickness of core, cm. | Volume, liters | Critical mass, kg. $U^{235}$ | Peak flux megawatt, $\times 10^{13}$ |
|---|---|---|---|---|
| 6 | 11 | 39.74 | 1.8928 | 6.894 |
| 6 | 17 | 77.44 | 2.3151 | 4.571 |
| 8 | 15 | 77.42 | 2.6285 | 3.827 |
| 6 | 19 | 77.72 | 2.4123 | 4.513 |
| 6 | 15 | 77.61 | 2.3082 | 4.543 |
| 5 | 8 | 32.67 | 1.9726 | 6.218 |

FIGURES 4 and 5 illustrate a heterogeneous reactor 30 having a rotary fuel element 31 partly enclosed by a thermal neutron absorber 33 and passing through a hole 36 in a beryllium reflector 35.

The following constructional example is given solely by way of illustration:

The fuel element 31 consists of a ring having 6 ft. in diameter and made of a suitable material of the type hereinabove described. A slow-speed gear drive 32 is used for continuously rotating the ring 31 about its center. Thermal neutron absorber 33 consists of a sheet of cadmium jacketed with aluminum and surrounding the fuel element 31 while it is outside the hole 36 consituting the active zone. The beryllium reflector 35 is cylindrical in shape, having an external diameter of 2 ft. 3 in. and a height of 1 ft.; it is used to establish a nuclear chain reaction. The hole 36 in the reflector 35 is centrally located and has a diameter of 9 in. The reflector contains conventional poison control rods 34 of boron or the like, which control the reaction. The control rods 34 are connected with control rod drive mechanisms 37 and control rod safety scram devices 38 of the usual type. The entire fuel region is placed within a tank of water to provide cooling.

The operation of the reactor is substantially the same as that previously described.

Figure 6:
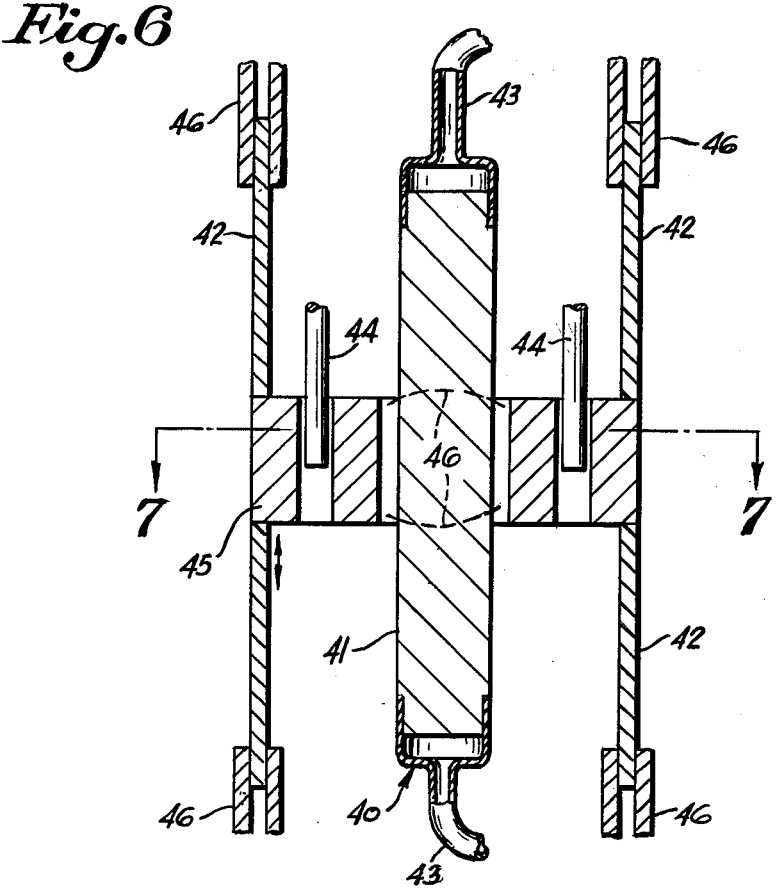
FIGURE 6 is a schematic vertical cross-sectional view of a different embodiment of the present invention.
Figure 7:
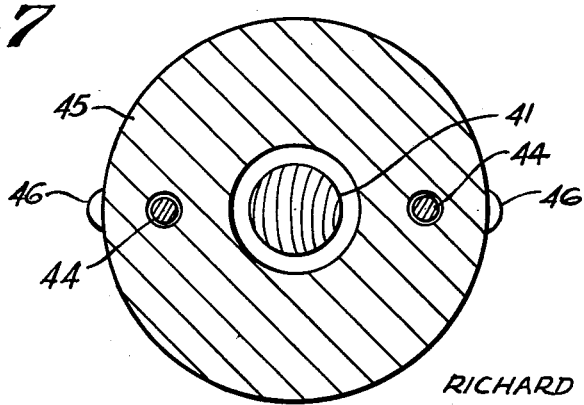
FIGURE 7 is partly a schematic horizontal cross-sectional view along the line 7—7 of FIGURE 6 and partly a top view.

FIGURES 6 and 7 illustrate a reactor 40 having a fixed fuel 41 consisting of a suitable material of the type hereinbefore described. A coolant continuously passes through the fuel 41 by means of pipes 43. A cylindrical beryllium reflector 45 is reciprocated by pistons 42 which are actuated by compressed air which is alternately admitted to cylinders 46. The up and down oscillations of the reflector 45 establish the chain reaction in different parts of the fuel 41 within the active zone 46. Poison control rods 44 are located in the reflector 45 to control the chain reaction; they also move up and down with the reflector 45.

The operation of this reactor is essentially the same as those previously described.

The described reactors have the substantial advantage that if the relative motion of the fuel is sufficiently fast, the heat of fission will be taken up as sensible heat of the fuel element and there will be no need to transfer all the fission heat from the fuel to the coolant within the active section of the reactor core. The fuel elements themselves may be much simpler in design than those used in prior art. In actual construction, however, it is necessary to assure the continual presence of a critical mass. It is apparent that by distributing the heat throughout a larger volume of fuel, the quantity of heat which must be transferred from fuel to coolant per unit volume of the core is reduced and thus the efficiency of cooling is increased. Furthermore, by the use of relatively moving heterogeneous fuel it is possible to eliminate to a large extent hot-channel factors which are present in conventional heterogeneous reactors because of local variations in the specific power.

It is apparent that the examples herein described have been given solely by way of illustration and not by way of limitation, and that they are subject to many variations and modifications within the scope of the present invention. All such variations and modifications are to be included within the scope of the present invention.

What is claimed is:

A nuclear chain reactor, comprising an elongated flux-producing heterogeneous fixed fuel, pipes connected with opposite ends of said fuel for passing a coolant through the fuel, a cylindrical beryllium reflector enclosing a portion of said fuel intermediate its ends, pistons connected with diametrically opposed ends of said cylindrical reflector, cylinders enclosing portions of said pistons for reciprocating said pistons along with said reflector, whereby said reflector is cycled along the fuel, said reflector having openings extending parallel to said fuel between said fuel and said pistons, and control rods extending into said openings.

References Cited in the file of this patent

UNITED STATES PATENTS

| 2,812,304 | Wheeler | Nov. 5, 1957 |
| 2,910,416 | Daniels | Oct. 27, 1959 |
| 2,936,273 | Untermyer | May 10, 1960 |
| 2,936,277 | MacNeill et al. | May 10, 1960 |
| 2,999,060 | Teitel | Sept. 5, 1961 |
| 3,047,483 | Polak | July 31, 1962 |
| 3,047,486 | Hanson | July 31, 1962 |